United States Patent [19]
Heimburger

[11] 3,732,146
[45] May 8, 1973

[54] PROCESS FOR THE ISOLATION OF NATIVE, HIGHLY PURIFIED PLASMINOGEN

[75] Inventor: Norbert Heimburger, Marbach near Marburg/Lahn, Germany

[73] Assignee: Behringwerke Aktiengesellschaft, Marburg/Lahn, Germany

[22] Filed: Dec. 22, 1970

[21] Appl. No.: 100,821

[52] U.S. Cl. .................................................195/66 B
[51] Int. Cl. ..............................................C07g 7/02
[58] Field of Search ...................195/66 B, DIG. 11, 195/63

[56] References Cited

UNITED STATES PATENTS

| | | | |
|---|---|---|---|
| 3,066,079 | 11/1962 | Hagan et al. | 195/66 B |
| 3,234,106 | 2/1966 | Hink, Jr. et al. | 195/66 B |
| 3,340,156 | 9/1967 | Jensen | 195/66 B |
| 3,627,640 | 12/1971 | Blumberg et al. | 195/63 |

*Primary Examiner*—Lionel M. Shapiro
*Attorney*—Curtis, Morris & Safford

[57] ABSTRACT

Method for isolating native plasminogen in highly purified form from plasma or serum by contacting the plasminogen-containing material with a water-insoluble carrier containing an $\epsilon$-amino carboxylic acid and then eluting the carrier to recover plasminogen bound thereto.

11 Claims, No Drawings

PROCESS FOR THE ISOLATION OF NATIVE, HIGHLY PURIFIED PLASMINOGEN

The present invention relates to a method for isolating purified plasminogen from plasma or serum.

There are already known processes in which plasminogen can be isolated by precipitation of the serum by means of alcohol and extraction of the precipitate with mineral acids. Chromatography on carboxymethyl-cellulose is also known as a process for isolating plasminogen. However, these processes are time-consuming, cumbersome and expensive. Due to the low yields, they are unsuitable for commercial application.

It is also known that $\epsilon$-aminocaproic acid, p-aminomethylbenzoic acid and 4-aminomethyl-cyclohexane carboxylic acid-(1) have an antifibrinolytic action because they inhibit the activation of plasminogen by streptokinase or urokinase.

Now, we have found a process permitting the isolation of native, highly purified plasminogen, wherein plasminogen obtained from plasma or serum or from a plasminogen-containing plasma or serum fraction is adsorbed onto a water-insoluble carrier containing an aminocarboxylic acid with an amino group standing in $\epsilon$-position to the carboxylic group, unspecific accompanying proteins are removed by washing with an aqueous buffer solution having a pH of 5 to 6.5 and a molarity of 0.05 to 0.15, the plasminogen is eluted with a buffer solution having a pH-value in the range of 2.0 to 3.5 or 9.0 to 10.2 and a molarity of 0.05 to 0.15, and furthermore containing an aminocarboxylic acid of the type described above in a molar ratio of 0.05 : 0.1, then, if desired or required, the product is enriched by precipitation with ammonium sulfate and finally desalted in known manner, for example by dialysis, and dried by freeze-drying.

As starting material for the plasminogen, plasma, serum or a plasminogen-containing plasma or serum fraction of human or animal origin may be used.

As the water-insoluble carrier, a copolymer of styrene or ethylene or butylene or, preferably propylene, and maleic acid anhydride in a ratio of 1 : 1 is used, which copolymer has been cross-linked in the presence of an aminocarboxylic acid with an aliphatic or aromatic diamine, for example pentamethylenediamine, hexamethylenediamine or 0-phenylene-diamine. In the case of styrene, cross-linking can be effected with divinylbenzene.

The reaction of the aminocarboxylic acid with the carrier takes place by the reaction of one amino group with one maleic acid anhydride unit, whereby a peptide-like bond is formed. Under "aminocarboxylic acids," there are to be understood such acids as contain one amino group in $\epsilon$-position to the carboxyl group, as is the case, for example, with $\epsilon$-aminocaproic acid, 4-aminomethylbenzoic acid or 4-aminomethyl-cyclohexane-carboxylic acid. Of course, other aminocarboxylic acids in which the steric distance between the amino group and the carboxyl group is of a similar order as that in the aforementioned compounds may also be used. The most suitable compounds, however, are aminocarboxylic acids which contain, in addition to the amino group, one other reactive group capable of providing a bond to the adsorbent, for example an amino or hydroxyl group in the $\alpha$, $\beta$, $\gamma$ or $\delta$-position of an aliphatic chain or in ortho or meta-position in a ring. This is the case, for example, with lysine. A carrier prepared with the use of such an aminocarboxylic acid contains free carboxyl groups as well as free amino or hydroxyl groups; the yields of plasminogen obtained with the aid of such a carrier are higher and the specificity is greater.

With the aid of the described water-insoluble carrier, plasminogen can be adsorbed with good yields from aqueous solutions having a pH-value of from 5.0 to 7.8. The adsorption is preferably carried out by a batch process; a column process, however, may also be used.

For removing unspecific proteins, di-sodium-hydrogen-phosphate-citric acid buffers, phosphate buffers or citrate buffers may be used.

Suitable acid eluants for the elution of plasminogen are, for example, buffer mixtures of glycine and hydrochloric acid. If an alkaline eluant is used, it is possible to employ, for example, a solution of ammonia, tris-(hydroxymethyl)aminomethane or di-sodium-hydrogen-phosphate. The molarity of the eluants is in general 0.5 to 0.15 and preferably at 0.1; higher concentrations may also be used, but are senseless, because the eluants have to be removed later on. As displacing agents, the eluants further contain one of the above-described aminocarboxylic acids, preferably lysine, in a molarity of 0.05 to 0.1.

Prior to working up, it is preferable to subject the plasminogen-containing eluate to a preconcentration. For this purpose it is rendered neutral and the plasminogen is precipitated by means of ammonium sulfate, preferably by dialysis against a saturated ammonium sulfate solution. The aminocarboxylic acids used in the elution can then be removed by a following dialysis against a salt solution having a pH-value of 8 to 9 and a molarity of 0.1, preferably a di-sodium-hydrogen-phosphate solution. The plasminogen solution so purified is then adjusted to physiological conditions by dialysis against a physiological salt solution, for example a 0.9 percent sodium chloride solution, a Ringer solution or a sodium phosphate solution, having a pH-value of from 6.5 to 7.5 and a molarity from about 0.05 to 0.15.

The process of the invention permits a time-saving preparation of plasminogen in good yields. The plasminogen so obtained is pure as has been proved by immuno-electrophoresis. The potency is measured in Christensen units (Chr-E) (cf. J. Clin. Invest. 28, 163 (1949)).

The following examples illustrate the invention:

EXAMPLE I 100 mg of a copolymer of propylene and maleic acid anhydride were made into a paste with a 0.15 M potassium phosphate buffer having a pH-value of 7.5 and then suspended in 0.15 M potassium phosphate buffer having a pH-value of 7.5 to a total volume of 5 ml. Then, 10 mg of hexamethylene-diamine, which had been dissolved in 1 ml of the above-indicated phosphate buffer, were added, while stirring. Subsequently, 5 me of 2.5 percent lysine solution which had been buffered with potassium phosphate and which had a pH-value of 7.5 were transferred with a pipet and the whole batch was stirred for 24 hours at +4°C. The insoluble cross-linked product was then isolated by centrifugation, washed with a physiological salt solution until it was free of lysine, rinsed with distilled water and freeze-dried.

100 mg of the freeze-dried cross-linked product were made into a paste with 7 ml of human plasma and then suspended in 70 ml of human plasma. The pH value was adjusted to 7.0 by means of dilute hydrochloric acid and the batch was stirred for 30 minutes at 37°C. The adsorbent was removed by centrifugation and washed with 0.15 M sodium phosphate buffer having a pH-value of 6.4 until the washing waters were free of proteins. The elution of the plasminogen was effected with 25 ml of a 0.1 M tris-(hydroxymethyl)-aminomethane solution having a pH-value of 10.0 and containing 0.05 M lysine. The eluate was neutralized with normal hydrochloric acid and dialyzed against the same volume of a saturated ammonium sulfate solution, while stirring. The precipitate was separated by centrifugation, taken up in 2-3 ml of 0.1 M di-sodium hydrogen-phosphate solution, then dialyzed twice for 12 hours each against each time a 100-fold volume of the same solution and then against 0.1 M sodium phosphate buffer having a pH-value of 7.5.

3 ml of a 0.31 percent plasminogen solution having 37,300 Christensen units (Chr-U)/me and 12,000 Chr-U/mg of protein were obtained as final product. The starting material had a plasminogen titer of 4,000 Chr-U/ml and 53 Chr-U/mg of protein.

The process started from a total of 280,000 Chrs-U/ml and 112,000 Chr-U were recovered, which corresponded to a yield of 40 percent.

The above indicated values show that the process of the invention permit an enrichment by the factor of 1 : 200. After the adsorption, the starting plasma still contained 99 Chr-U/ml, which were 2.2 percent of the starting value.

EXAMPLE 2

4 Liters of human plasma were adjusted to a pH-value of 7.0 by means of dilute hydrochloric acid and then incubated for 30 minutes, at 37°C, while stirring, with 5.7 grams of a freeze-dried copolymer prepared from propylene and maleic acid anhydride according to Example I, which copolymer contained covalently bound lysine and had been cross-linked with hexamethylene-diamine. The plasminogen-containing adsorbent was separated by centrifugation, washed with 0.15 M sodium phosphate buffer having a pH 6.4 until it was free of proteins and then diluted with 1,100 ml of 0.1 M ammonia solution which contained 0.05 M lysine. By neutralization with dilute hydrochloric acid, concentration of the eluate with a 50% ammonium sulfate saturation, dissolution of the ammonium sulfate residue in 90 ml of 0.1 M di-sodium hydrogen-phosphate solution, dialysis against the same solution and then against 0.15 M sodium phosphate buffer having a pH-value of 7.5, there were obtained 100 ml of a 0.4 percent plasminogen solution having 47,000 Chr-U/ml. The yield was 29 percent, referred to 4 l of plasma with an activity of 4,000 Chr-U/ml. The specific acitivity of the plasminogen so isolated was 11,800 Chr-U/mg. The plasminogen activity of the plasma adsorbed was found to be 70 Chr-U/ml.

EXAMPLE 3

70 ml of bovine plasma were incubated for 30 minutes, at 37°C, while stirring, with 100 mg of the copolymer cross-linked with lysine and prepared according to Example I. The adsorbent which was recovered by centrifugation was washed with 0.15 M sodium phosphate buffer having a pH-value of 6.4 until it was free from proteins and then eluted with 25 ml of a 0.15 M di-sodium hydrogen-phosphate solution which contained 0.05 m $\epsilon$-aminocaproic acid. The eluate was dialyzed against a 0.1 molar tris-(hydroxymethyl)aminomethane-solution and, after removal of the $\epsilon$-aminocaproic acid, against 0.1 M sodium phosphate buffer having a pH-value of 7.5. Thereby, 22 ml of a 0.1 percent solution were obtained which had, per milliliter, thrice the activity of bovine plasma and thus contained 94 percent of the bovine plasma used. The comparative determination of the activity was effected on plasminogen-free bovine fibrenogen, after optimum activation of the plasminogen by urokinase, a plasminogen activator obtained from human urine.

EXAMPLE 4

100 mg of a copolymer from propylene and maleic acid anhydride in a ratio of 1 : 1 were finely suspended in 5 ml of 0.15 M potassium phosphate buffer having a pH-value of 7.5. 10 mg of hexamethylene-diamine in 1 ml, and 94 mg of $\epsilon$-aminocaproic acid in 5 ml, of potassium phosphate buffer were added thereto by means of a pipet in intervals of 2 minutes. The reaction batch was stirred for 12 hours at +4°C, the insoluble gel was separated by centrifugation, washed with physiological salt solution until it no longer contained unbound $\epsilon$-aminocaproic acid, subsequently washed with water and freeze-dried.

100 mg of the freeze-dried, $\epsilon$-aminocaproic acid-containing copolymer were incubated for 30 minutes, at 37°C, while stirring, with 70 ml of human plasma having a pH-value of 7.0. The plasminogen-containing copolymer was recovered by centrifugation, washed with 0.15 M sodium phosphate buffer having a pH-value of 6.4 until it was free by proteins and the plasminogen was diluted with 25 ml of a 0.05 M ammonia solution which contained 0.05 M $\epsilon$-aminocaproic acid. The neutralized eluate was concentrated with a 50 percent ammonium sulphate solution and dialyzed against 0.1 M di-sodium hydrogen-phosphate solution. After removal of the $\epsilon$-aminocaproic acid used for the elution, the whole was subjected to another dialysis against 0.1 M sodium phosphate buffer having a pH-value of 7.5. 3.5 ml of a 0.2 percent plasminogen solution with 12,200 Chr-U/ml or 6,100 Chr-U/mg of substance were obtained in this manner. The yield was 16 percent, referred to the starting material of 70 ml with 3,800 Chr-U/ml.

EXAMPLE 5

100 mg of a copolymer from propylene and maleic acid anhydride were finely suspended in 5 ml of 0.15 M potassium phosphate buffer having a pH-value of 7.5. Then, 1 ml of a 1 percent hexamethylene-diamine solution and after 2–3 minutes 5 ml of a 2 percent solution of 4-aminomethyl-cyclohexane-carboxylic acid-(1) were stirred into the suspension. The reaction batch was stirred for 12 hours at +4°C, the gel that formed was isolted by centrifugation, washed with physiological salt solution until it no longer contained free 4-aminomethyl-cyclohexane-carboxylic acid-(1), rinsed with water until it was free from salt and freeze-dried.

70 ml of human plasma were titrated with dilute hydrochloric acid to a pH-value of 5.5 and incubated for 30 minutes, at 37°C, while stirring, with 100 mg of the adsorbent prepared as described above. The adsorbent was then removed by centrifugation and washed with 0.15 M sodium phosphate buffer having a pH-value of 6.4 until no protein could be detected in the washing water. The plasminogen was then eluted with 25 ml of a 0.1 m tris-(hydroxymethyl)-aminomethane solution, which contained 0.05 m lysine. The lysine was removed by dialysis against a 0.1 m Tris-solution, and the solution obtained was dialyzed against a 0.1 m sodium phosphate buffer having a pH-value of 7.5. As the final product, 20 ml of a 0.15 percent solution having 6,700 Chr-U/ml were obtained. The yield was 134,000 Chr-U (= 39%), referred to the starting plasma which had 4,800 Chr-U/ml.

EXAMPLE 6

200 mg of lysine were dissolved in 100 ml of 0.05 molar sodium diethylbarbiturate buffer solution at pH 8, 10 ml of a molar solution of calcium acetate and 1 ml of 0.25 percent aqueous hexamethylenediamine were added and the batch was cooled to 4°C. Subsequently 20 ml of a 0.5 percent solution of the copolymer of propylene and maleic acid anhydride in DMSO were added dropwise. The whole was stirred at 4°C for 16 hours and the cross-linked product was isolated by centrifugation, washed with physiological salt solution and distilled water and lyophilized.

100 mg of the product were suspended in 70 ml of human plasma, the pH was adjusted to 6.0 by means of dilute HCl and the whole batch was stirred at 37°C for 30 minutes. The adsorbent was removed by centrifugation and washed with 0.15 molar sodium phosphate buffer pH 6.4 until protein-free. It was then eluted with 25 ml of a 0.1 molar solution of tris-(hydroxymethyl)-aminomethane pH 10.0 containing 0.05 molar lysine. The eluate was neutralized with 1 percent acetic acid and subsequently lyophilized. The dried product was dissolved in 4 ml of distilled water and dialyzed against 0.1 molar sodium phosphate buffer pH 7.5.

The dialyzed solution, the volume of which had increased to 5 ml during dialysis, had an activity of 45,000 Chr-U/ml whereas the plasma started with contained 5,000 Chr-U/ml. The overall yield was 64 percent.

We claim:

1. A method for isolating native plasminogen in highly purified form which comprises: (1) contacting plasma, serum, or a plasma fraction or serum fraction containing plasminogen with a water-insoluble carrier to adsorb plasminogen thereon, said carrier being a cross-linked copolymer of maleic acid anhydride and a comonomer selected from the group consisting of styrene, ethylene, propylene, and butylene, said carrier having been reacted with an $\epsilon$-aminocarboxylic acid prior to contact with the plasminogen-containing material; (2) washing the carrier with an aqueous buffer solution having a pH from 5 to 6.5 and a molarity from 0.05 M to 0.15 M to remove unspecific accompanying proteins; and (3) eluting plasminogen from said carrier with a buffer solution having a pH from 2.0 to 3.5 or from 9.0 to 10.2, a molarity from 0.05 M to 0.15 M, and containing an $\epsilon$-aminocarboxylic acid in a molarity from 0.05 M to 0.1 M.

2. A method as in claim 1 wherein said copolymer is a copolymer of maleic acid anhydride and said comonomer in a 1:1 ratio.

3. A method as in claim 1 wherein said copolymer is a copolymer of maleic acid anhydride and propylene.

4. A method as in claim 3 wherein said copolymer is a copolymer of maleic acid anhydride and propylene in a 1:1 ratio.

5. A method as in claim 1 wherein said $\epsilon$-aminocarboxylic acid is $\epsilon$-amino-caproic acid, 4-aminomethyl-benzoic acid, or 4-aminomethylcyclohexane-carboxylic acid.

6. A method as in claim 1 wherein said copolymer is a copolymer of maleic acid anhydride and styrene cross-linked with divinylbenzene.

7. A method as in claim 1 wherein said copolymer is cross-linked by reaction with a diamine.

8. A method as in claim 7 wherein said diamine is pentamethylene diamine, hexamethylene diamine, or a phenylene diamine.

9. A method as in claim 1 wherein said eluted plasminogen is enriched by precipitation with ammonium sulfate and is then de-salted and dried.

10. A method as in claim 9 wherein said enriched plasminogen is desalted by dialysis.

11. A method as in claim 9 wherein said enriched plasminogen is dried by freeze-drying.

* * * * *